June 6, 1933. H. D. SCHRADER 1,912,730
GAS BURNER AND MIXING CHAMBER THEREFOR
Filed April 11, 1932
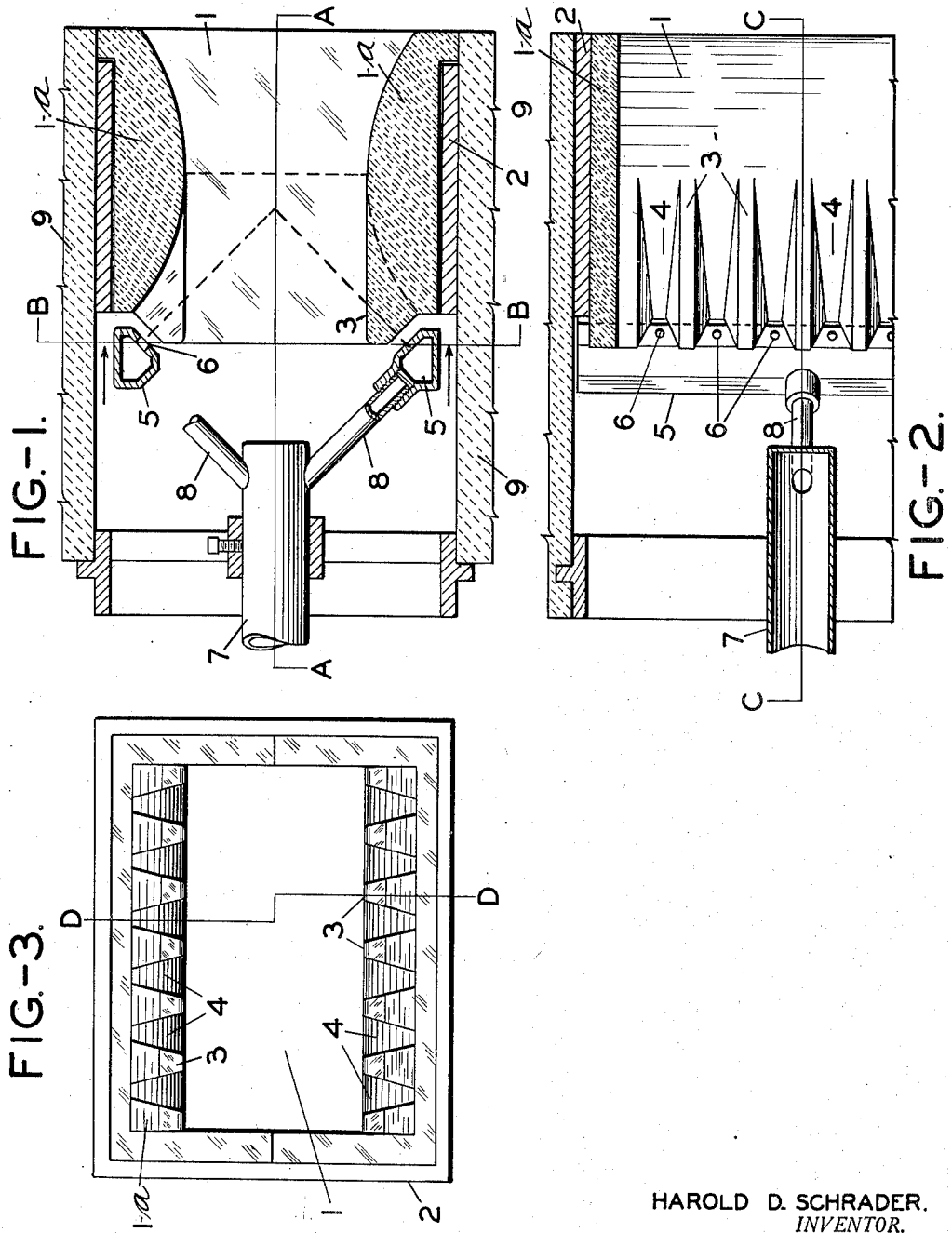
HAROLD D. SCHRADER.
*INVENTOR.*
BY *James R Leole*
*ATTORNEYS.*

Patented June 6, 1933

1,912,730

UNITED STATES PATENT OFFICE

HAROLD D. SCHRADER, OF TULSA, OKLAHOMA

GAS BURNER AND MIXING CHAMBER THEREFOR

Application filed April 11, 1932. Serial No. 604,415.

My invention relates to new and useful improvements in gas burners and mixing chambers therefor, and has for its objects to provide a gas burner and mixing chamber which will permit of a more efficient mixture of gas and air, and hence of a more ready and perfect combustion, than is possible with other burners, and to provide such an apparatus in form adapted to use at either high or low pressures, and more particularly to provide small primary mixing chambers wherein the gas is emitted from the burner tips or orifices with an aspiratory effect upon the air therein as the gas and air passes thru said primary mixing chambers into the main mixing chamber, and to also heat said fluid causing it not only to commingle more freely but to be speeded in its travel to the main mixing chamber by its expansion, to moreover provide the main mixing chamber in the form of a so called flat reverse Venturi tube with the jets of the burners arranged and disposed so as to direct the currents of the gas across the tube to obtain a more perfect mixture with the air admitted into the mixing chamber, and to also provide the burner in a form adapted to be substantially shielded from the heat generated by the combustion of said air and gas.

With the above and other objects in view which will appear as the description proceeds, my invention consists in the novel features hereinafter set forth in detail, illustrated in the accompanying drawing and more particularly pointed out in the appended claims.

Referring to the drawing in which numerals of like character designate similar parts thruout the several views:

Fig. 1 is a view in longitudinal cross-section, of the burner and mixing chamber, with the burner proper being shown in the form of an upper and a lower manifold with a series of orifices or burner tips therein, the lower manifold being shown as on line C—C of Fig. 2 and the mixing chamber proper being shown as on line D—D of Fig. 3.

Fig. 2 is a top plan view of said burner and mixing chamber on line A—A of Fig. 1.

Fig. 3 is a view in elevation of the mixing chamber showing the fissures which form the series of primary mixing chambers above mentioned, on line B—B of Fig. 1.

In the drawing 1 represents generally the main mixing chamber which preferably is formed by a refractory substance 1a, held in a frame 2 such as of iron. The mixing chamber 1 is preferably in form somewhat resembling what might be termed a flat reverse Venturi tube having a series of fins or vanes 3 thereon at the entrance end of the tube which said vanes form fissures 4 between themselves, thru which fissures the gas to be burned is caused to pass from the burner tips or orifices, which said fissures form the primary mixing chambers for the gas and air traveling therethru. These fissures are arranged about the entrance of the mixing chamber proper or main mixing chamber, and are as a fact a part of the main mixing chamber and lie within the contour of the venturi as the vanes are imposed on the surface of the Venturi tube mentioned. While shown in the form of a so called flat reverse Venturi tube, any other form of construction wherein like kind of fissures may be placed at the entrance of the mixing chamber, may be employed, but for economy and saving of space, the form shown is preferred and is advantageous.

In its preferred form of construction, the gas burner consists of manifolds 5 positioned across the face of the mixing chamber at the edge thereof but sufficiently removed from the substance forming the said mixing chamber to permit air to pass freely into the chamber thru the fissures 4 therein, and with said manifold having therein a series of orifices or burner tips 6 disposed so that the gas discharged from each orifice will be directed into and pass thru one of the fissures 4. Preferably, the angle at which the gas is directed would be such that the current of the fluid from the upper and lower manifolds would converge or tend to converge at a point as indicated by the dotted lines in Fig. 1 drawn from the manifolds into the mixing chamber, which point would be reached by the fluid prior to passing thru the most constricted portion of the Venturi tube, which portion would lie as indicated by the dotted line in Fig. 1 drawn across the throat of the tube. The manifold 5 are fed thru a gas pipe 7 and its laterals 8. The air duct to the burner is of conventional form controlled by dampers, not shown, in the usual manner, permitting the air to enter about the pipe 7. The whole apparatus is placed in the wall 9 of the furnace or combustion chamber in the usual manner.

In operation, pipe 7 is connected into a source of supply of the gas to be burned, and the air enters the mixing chamber in the usual manner about said pipe. Lateral ducts 8 connected into the pipe 7 supply the gas to the manifolds 5 thru which the gas is conducted to the burner tips or orifices 6, from which the gas is emitted into the mixing chamber 1 thru fissures 4. The restricted area of the fissures, together with the current of gas issuing from the orifices, creates a suction of the air into the fissures, and the air is speeded along by the current of gas emitted from said orifices. The travel of both air and gas is further hastened because of its expansion due to the heat emanating from the refractory material of which the tube and vanes forming the fissures are formed. The heat therefrom also accelerates the mixture of the two gases, and promotes a condition whereby the mixture in the main mixing chamber is more readily effected. The mixture is also speeded up by jetting the currents across the venturi and having them converge prior to passing thru the most restricted portion of the tube.

The manifolds 5 are materially protected from the generated heat, as they are shielded by the fins or vanes 3 and by the body portion of the mixing chamber, so that they do not deteriorate as quickly as if exposed to the direct heat.

Having thus fully disclosed my invention, what I claim and desire to secure by Letters Patent, is:

1. The combination of a mixing chamber for a gas burner, in which chamber air and gas to be burned may mix and with said chamber comprising a flat tube of which two of the opposite sides thereof are convex, a series of fissures in both of said convex walls positioned at the fluid entrance end of said tube; a gas manifold positioned at each of said series of fissures and connected with a source of supply of gas to be burned, a series of orifices in said manifold thru which orifices the gas from said manifold may be emitted into said mixing chamber, and with each of said orifices of said series positioned opposite to one of said fissures and disposed so as to eject a stream of gas into the fissure opposite to it.

2. The combination as claimed in claim 1, and with said orifices in both of said manifolds directed at an angle to cause the streams of gas emitted from said manifolds to normally converge prior to passing thru the most restricted area of said tube.

3. A mixing chamber for a gas burner, in which chamber air and gas to be burned may mix, and with said mixing chamber comprising a flat tube two of the opposite walls of which are convex, and a series of fissures in said convex walls and positioned at the fluid entrance end of said tube.

4. A mixing chamber for a gas burner, in which chamber air and gas to be burned may mix, and with said chamber comprising substantially a flat Venturi tube two of the opposite walls of which are convex, and a series of fissures in said convex walls and positioned at the fluid entrance end of said tube.

In testimony whereof, I affix my signature.

HAROLD D. SCHRADER.